United States Patent [19]

Dougherty

[11] 4,027,486
[45] June 7, 1977

[54] ADJUSTABLY SUBMERSIBLE BREAKWATER

[76] Inventor: Earle T. Dougherty, 3420 N. 71st Ave., Phoenix, Ariz. 85033

[22] Filed: Mar. 2, 1976

[21] Appl. No.: 663,097

[52] U.S. Cl. .................................... 61/5; 114/267
[51] Int. Cl.² .......................................... E02B 3/06
[58] Field of Search .................. 61/1 F, 5, 4, 3; 114/.5 T, .5 F

[56] References Cited

UNITED STATES PATENTS

| | | | |
|---|---|---|---|
| 1,004,718 | 10/1911 | Wieland | 61/5 |
| 3,022,632 | 2/1962 | Parks | 61/5 |
| 3,628,334 | 12/1971 | Coleman | 61/5 |
| 3,710,577 | 1/1973 | Matheson | 61/5 |
| 3,755,829 | 9/1973 | Walklet | 114/.5 R |
| 3,953,977 | 5/1976 | Kikui et al. | 61/5 |

Primary Examiner—Paul R. Gilliam
Assistant Examiner—Alex Grosz
Attorney, Agent, or Firm—Herbert E. Haynes, Jr.

[57] ABSTRACT

A plurality of elongated tanks positioned in parallel relationship with respect to each other are swingably interconnected at their aligned ends to provide a yieldingly undulating breakwater apparatus. The buoyancy of each of the tanks is individually adjustable so that the ratio of floating tanks to submerged tanks, and the various depths thereof, can be altered to suit the prevailing wave and current characteristics of a particular installation site.

6 Claims, 6 Drawing Figures

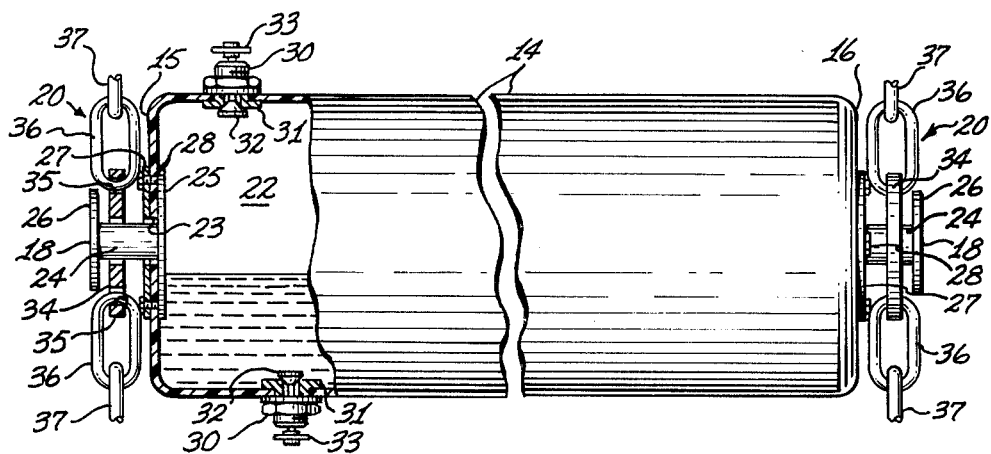
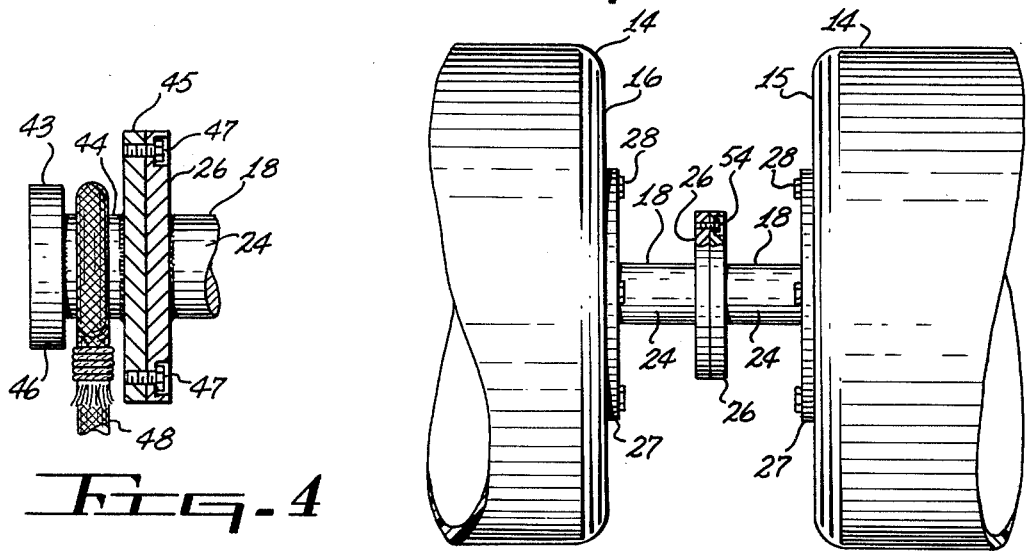
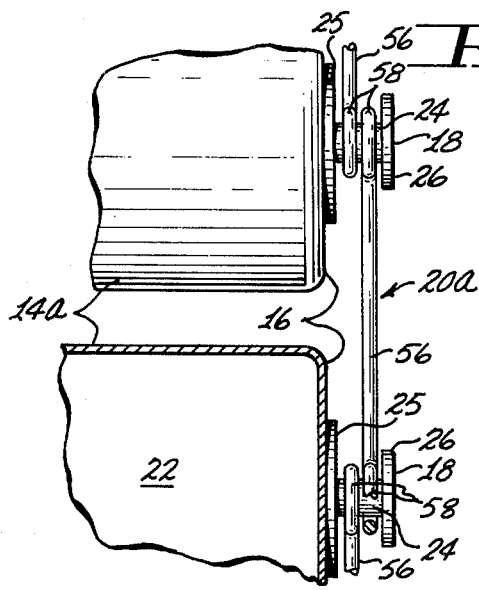

ADJUSTABLY SUBMERSIBLE BREAKWATER

BACKGROUND OF THE INVENTION

1. Field of the Invention

This invention relates to a breakwater structure, and more particularly to an adjustably submersible breakwater.

2. Description of the Prior Art

Structures of timber, masonry, cement, earth, and other materials have traditionally been employed to form artificial embankments which serve to break the force of incoming waves and thereby protect a harbor or beach. Such breakwaters are normally unyielding rigid structures and therefore are subject to damage and erosion inflicted by heavy seas. These factors along with the high initial installation costs have lead to the development of what has come to be called floating breakwaters. In general, floating breakwaters employ objects, such as used automobile tires, that are interconnected to form a blanket-like structure. The blanket-like structure is suitably anchored to the ocean floor and will ride atop the waves and swells in an undulatory motion which dampens wave action. Since these floating breakwaters ride on the ocean surface, they depend entirely on anchor cables or chains for their mooring, and therefore, are subject to being torn from their moorings by the tremendous forces that are applied thereto by the incoming waves. Further, these floating breakwaters have no effect upon undercurrents.

Therefore, the need exists for a new and useful breakwater structure which overcomes some of the problems of the prior art.

SUMMARY OF THE INVENTION

In accordance with the present invention, a new and useful breakwater assembly is disclosed as employing a plurality of elongated tanks which are disposed in parallel relationship with respect to each other, and are swingably interconnected at their aligned ends to form an undulating breakwater structure. The lower end tank is suitably moored and all the tanks are individually adjustable with regard to the buoyance thereof so that some of the tanks will float on the surface of the water and other of the tanks will be submerged at various depths below the surface. The floating tanks serve to dampen wave action and the submerged tanks provide an anchoring stability to the breakwater assembly and will also dampen undercurrents. The improved anchoring or mooring stability provided to the breakwater assembly by the submerged tanks is due to the inherent resistance of submerged objects to sudden movements.

In addition to the adjustably submersible feature, the breakwater assembly of the present invention is variably configurable as to the length and width thereof to accommodate the needs of particular installation sites. The variably configurable feature includes the capability of easily changing the number of tanks which are disposed in parallel relationship, which will alter the length of the breakwater, and the capability of axially interconnecting as many of the tanks as are needed to achieve any desired width of the breakwater.

Accordingly, it is an object of the present invention to provide a new and useful breakwater assembly.

Another object of the present invention is to provide a new and useful breakwater assembly which is adjustably submersible.

Another object of the present invention is to provide a new and useful breakwater assembly which is adjustably submersible, and may be easily altered as to the length and width thereof.

Another object of the present invention is to provide a new and improved breakwater assembly which includes a plurality of elongated tanks disposed in parallel relationship with respect to each other and having their aligned ends swingably interconnected.

Another object of the present invention is to provide a new and improved breakwater assembly which includes a plurality of elongated tanks disposed in parallel relationship with respect to each other and having their aligned ends swingably interconnected, with each of those tanks being individually adjustable as to the buoyancy thereof.

Another object of the present invention is to provide a new and improved breakwater assembly which includes a plurality of elongated tanks disposed in parallel relationship with respect to each other and having their aligned ends swingably interconnected, with each of those tanks being individually adjustable as to the buoyancy thereof, so that the ratio of floating tanks to submerged tanks may be altered to suit the requirements of particular installation sites.

Still another object of the present invention is to provide a new and improved breakwater assembly of the above described character which is anchored by connection of anchoring means attached to the tank having the least buoyancy.

The foregoing and other objects of the present invention, as well as the invention itself, may be more fully understood from the following description when read in conjunction with the accompanying drawings.

BRIEF DESCRIPTION OF THE DRAWINGS

FIG. 3 is an enlarged fragmentary sectional view taken along the line 3—3 of FIG. 1 to illustrate the various features of the elongated tanks of the present invention.

FIG. 4 is an enlarged fragmentary view illustrating one of the features of the present invention.

FIG. 5 is an enlarged fragmentary view illustrating the interconnection of a pair of axially aligned tanks.

FIG. 6 is an enlarged fragmentary sectional view illustrating a modified form of the adjustably submersible breakwater apparatus of the present invention.

DESCRIPTION OF THE PREFERRED EMBODIMENTS

Figure 1:
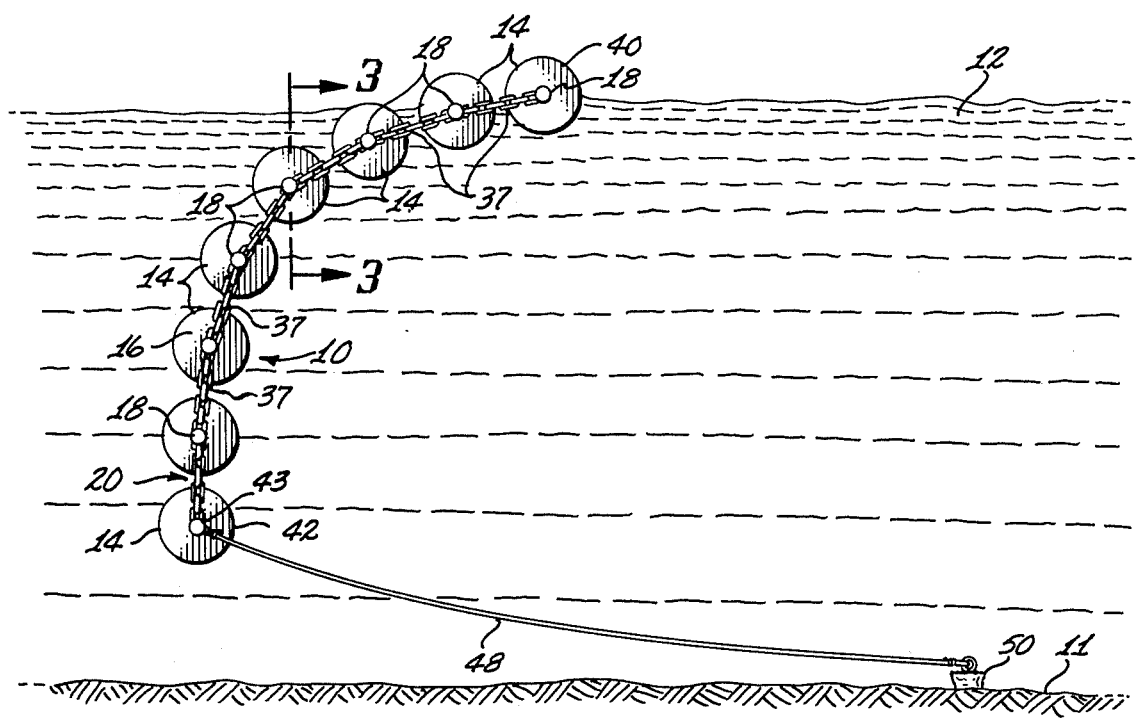
FIG. 1 is a side elevational view of the adjustably submersible breakwater apparatus of the present invention.
Figure 2:
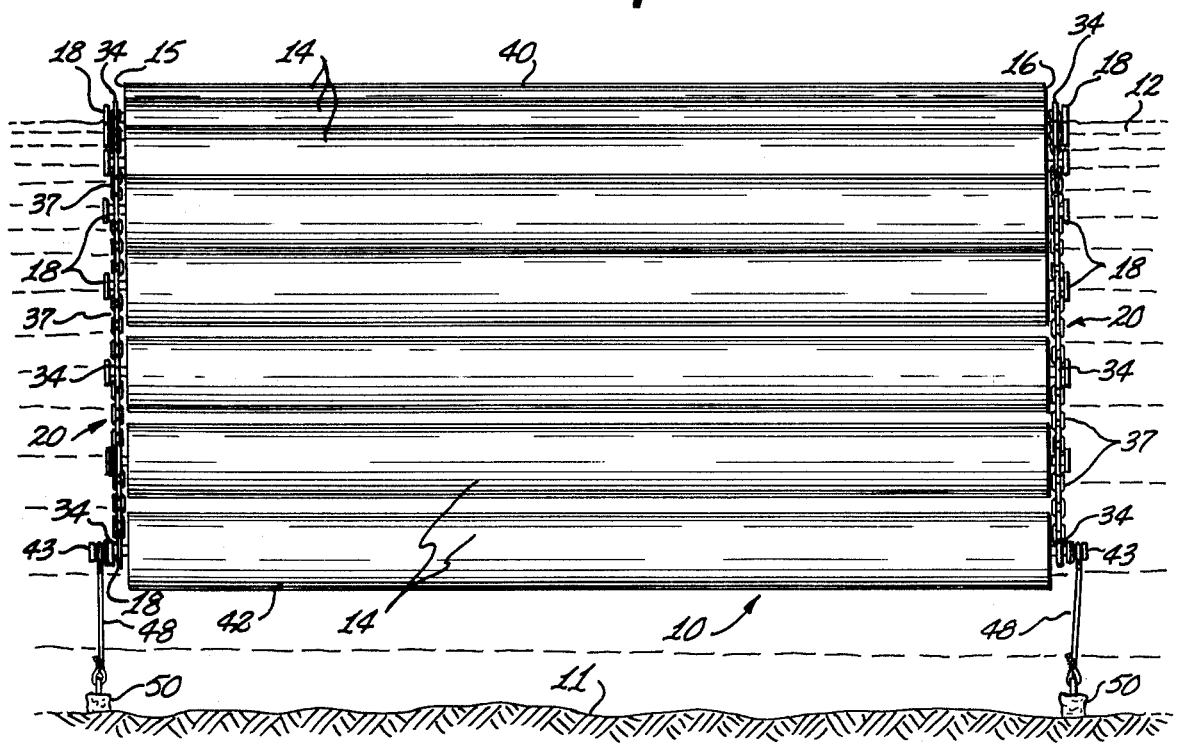
FIG. 2 is a front elevational view of the adjustably submersible breakwater apparatus of the present invention.

Referring more particularly to the drawings, FIGS. 1 and 2 illustrate the adjustably submersible breakwater assembly of the present invention which is indicated generally by the reference numeral 10, and which is shown as being suitably anchored to the bottom 11 of a body of water 12.

As will hereinafter be described in detail, the breakwater assembly 10 is shown to include a plurality of identical elongated tanks 14 disposed in spaced substantially parallel relationship with respect to each other so that the opposite ends 15 and 16 of the tanks 14 are substantially aligned. The tanks 14 are each provided with a pair of spool members 18 with each of those spool members 18 being axially affixed to a different one of the opposite ends 15 and 16 of the tank. The aligned spool members 18 of adjacent tanks 14 are provided with interconnection means 20 coupled therebetween for connecting the plurality of tanks 14 to form the breakwater assembly 10. The interconnection means 20 are configured, as will be described, so that the tanks 14 are free to rotate about their respective longitudinal axes and are also free to swing relative to each other.

As hereinbefore mentioned, the tanks 14 are identical structures and are shown as being cylindrical, however, it will be appreciated that other geometric cross sectional configurations could be employed.

The tanks 14 of the preferred embodiment of the present invention are fabricated of a suitable material, such as a heavy gage plastic, having the characteristics of being semi-rigid and resilient. With these characteristics, the tanks 14 will maintain their basic shape and are capable of absorbing many of the forces to which they are subjected as a result of heavy seas, collision with adjacent tanks, and the like. FIG. 3 illustrates a typical one of the tanks 14 of the present embodiment as being an elongated hollow structure having a chamber 22 which is hermetically sealed. Each of the opposite ends 15 and 16 of the tank 14 have an axially disposed aperture 23 (one shown) formed therein in which one of the pair of spool members 18 are affixed. The spool members 18 each include a cylindrical shaft 24 having an inner plate 25 fast on one end thereof and an outer plate 26 fast with the opposite end. The inner plate 25 is positioned within the chamber 22 of the tank and is in engagement with the inner surface of the end wall 15 of the tank 14. The cylindrical shaft 24 of the spool member 18 extends from the inner plate 25 concentrically through the aperture 23 of the tank 14 so as to axially space the outer plate 26 from the end 15 of the tank. A ring 27, which may be split for ease of assembly, is concentrically positioned on the shaft 24 of the spool member 18 and is in engagement with the outer surface of the end 15 of the tank 14. Suitable bolts 28 pass through the ring 27, through the end 15 of the tank 14, and threadingly engage the inner plate 25 of the spool member 18 for leakproof affixation of the spool to the end of the tank 14.

Each of the tanks 14 is equipped with means for adjusting the buoyancy thereof, with that means being shown in FIG. 3 to include a diametrically opposed pair of valves 30. Various types of valves well known in the art may be employed for the purpose of adjusting the buoyancy of the tanks 14, and the specific valves 30 are but one form of the many types of valves which would accomplish the same results. Each of the valves 30 are in-line devices which are seen to include a housing 31 suitably mounted in a leakproof manner in the sidewall of the tank 14. A poppet valve 32 is threadingly mounted in the housing 31 for axial movement between a seated (closed) and an unseated (open) position, and such movement is manually accomplished by means of a suitable handle 33 affixed to the poppet valve 32.

Buoyancy of the tanks 14 is individually adjusted by operation of the shutoff valves 30 to achieve the desired amount of air and water within the chambers 22 of the tanks, as will hereinafter be described.

Each of the spool members 18 and of the tanks 14 is provided with a coupling disc 34 mounted on the cylindrical shaft 24 thereof, with those discs 34 being free to rotate about the longitudinal axis of their respective shafts 24. Each of the coupling discs 34 is formed with a pair of diametrically opposed apertures 35 by which the end links 36 of tank interconnecting chains 37 are coupled thereto. Thus, it may now be seen that the hereinbefore mentioned interconnection means 20 of this embodiment of the present invention includes a plurality of coupling discs 34 and a plurality of tank interconnecting chains 37. As shown best in FIG. 2, the tanks are positioned so as to be parallel with respect to each other and their opposite ends are in substantial alignment. Thus, the coupling discs 34 mounted on their oppositely located spool members, form two oppositely positioned substantially aligned rows of the coupling discs 34, and a different one of the plurality of tank interconnecting chains 37 is employed to interconnect each aligned pair of the coupling discs 34.

With the tanks 14 interconnected as described above it will be seen that the individual tanks 14 are free to rotate about their respective longitudinal axes, and the tanks will be free to swing relative to each other. Such movements provide the breakwater apparatus 10 with the capability of resistably responding to wave and current applied forces with an undulatory movement which will dampen those forces.

As previously described, the tanks 14 may be individually adjusted as to the buoyancy thereof. Such a capability permits the breakwater apparatus 10 to be preset so that the tanks 14 thereof will seek different levels in the water, and the ratio of floating tanks to submerged tanks can be altered to suit the requirements of particular installation sites. The function of the floating tanks is obviously to dampen the wave action of the water body. However, the submerged tanks serve to perform two functions, with the first being the dampening or resistance to the passage of undercurrents. The second function of the submerged tanks is that due to their weight and submerged condition, they will act as a resistive anchor for the breakwater apparatus 10 in that they will yieldingly resist any suddenly applied forces.

Referring again to FIGS. 1 and 2, it will be seen that the opposite end tanks 14 of the breakwater apparatus 10 will respectively assume upwardly and downwardly disposed positions, and those particular tanks will hereinafter be referred to as upper end tank 40, i.e., the one having the greatest buoyancy, and the lower end tank 42, i.e., the one having the least buoyancy.

The lower end tank 42 is provided with a pair of mooring spools 43 (FIG. 2) each of which is axially affixed to a different one of the spool members 18 thereof. FIG. 4 shows one of the mooring spools 43 as including a cylindrical shaft 44 having an attaching plate 45 on one end thereof and a head 46 on the opposite end. Attachment of the mooring spools 43 to their respective spool members 18 may be accomplished by affixing the attaching plates 45 of the mooring spools 43 to the outer plates 26 of the spool members 18 such as with suitable bolts 47. A pair of anchor or mooring cables 48 are each connected to a different one of the mooring spools 43 of the lower end tank 42, and extend downwardly therefrom for connection to suitable anchors 50. It will be apparent that the anchoring cables 48 could be directly connected to the coupling discs 34 of the lower end tank 42 instead of utilizing the mooring spools 43 as previously described.

In either event, the anchoring technique described above permits the adjustably submersible breakwater 10 to drift relative to the anchors 50 in response to reversing the currents as occur in tidal movements and allows the breakwater assembly 10 to move in a force absorbing undulatory motion. With the upwardly disposed tanks being free to move in a yieldingly resistive motion, a great deal of the forces applied to the breakwater assembly 10 by wave action will be absorbed thereby and relatively little or none of those forces will be transmitted through the breakwater 10 to the anchor cables 48.

It should be apparent that the number of tanks 14 positioned in parallel relationship with respect to each other can be easily altered to change the length dimension of the breakwater assembly 10 to suit installation requirements. As shown in FIG. 5, tanks 14 can also be placed in axial alignment to increase the width dimension of the breakwater apparatus 10. Such axial placement can be accomplished by positioning of the outer plates 26 of the aligned spool members 18 in abutting engagement and securing those abutting plates with suitable bolts 54 (one shown).

Referring to FIG. 6 in which a modification of the present invention is shown. In this embodiment, the tanks 14a are fabricated of a suitable rigid material such as metal, and the interconnection means 20a employs a rigid rod 56 having a loop member 58 fixed on each of the opposite ends thereof. The loops 58 of the rods 56 are mounted to loosely circumscribe the cylindrical shafts 24 of the aligned spool members 18, and thereby replace the coupling discs 34 and tank interconnecting chains 37 of the previously described embodiment.

It will be noted that when the coupling discs 34 and chains 37 are employed to form the interconnection means 20, the tanks 14 will be free to drift toward and away from each other within prescribed limits. Thus, in such a configuration, tanks of semirigid construction as previously described are preferred to eliminate, or at least substantially reduce, any damage which may result from the collision of adjacent tanks. In instances where the rigid rods 56 are employed to provide the interconnection means 20a, spacing of adjacent tanks is fixed and collision damage therebetween cannot occur.

While the principles of the invention have now been made clear in an illustrated embodiment, there will be immediately obvious to those skilled in the art, many modifications of structure, arrangements proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. An adjustably submersible breakwater assembly comprising:
    a. at least a pair of elongated hermetically sealed hollow tanks disposed in substantially parallel relationship with respect to each other and having their ends in substantial alignment;
    b. each of said tanks having a pair of spool members each of which is axially affixed to a different one of the opposite ends of said tank;
    c. interconnection means extending between the aligned ends of said tanks and coupled to the ones of said spool members mounted thereon for interconnection of said pair of tanks, said interconnection means pivotably connected to said spool members to allow said tanks to freely rotate about their respective axes and freely swing relative to each other;
    d. means on each of said tanks for individual adjustment of the buoyancy thereof; and
    e. means connected to at least one of said tanks for anchoring thereof.

2. An adjustably submersible breakwater assembly as claimed in claim 1 wherein said interconnection means comprises:
    a. a coupling disc rotatably mounted on each of said spool members; and
    b. a chain at each of the aligned ends of said pair of tanks, each of said chains having its opposite end links connected to a different one of said coupling discs.

3. An adjustably submersible breakwater assembly as claimed in claim 1 wherein said interconnection means comprises a rigid rod at each of the aligned ends of said pair of tanks and connected between the ones of said spool members thereon.

4. An adjustably submersible breakwater assembly as claimed in claim 1 wherein said means on each of said tanks for adjusting the buoyancy thereof includes at least one shutoff valve on said tank for selective passage of air and water between the interior and exterior thereof.

5. An adjustably submersible breakwater assembly as claimed in claim 1 wherein said means on each of said tanks for adjusting the buoyancy thereof includes a pair of shutoff valves each locate on a different opposite side of said tank for selective passage of air and water between the interior and exterior thereof.

6. An adjustably submersible breakwater assembly as claimed in claim 1 and further comprising a pair of mooring spools on at least one of said tanks, each of said mooring spools axially affixed to a different one of the pair of said spool members of said tank.

* * * * *